United States Patent [19]

Mani

[11] 3,741,471

[45] June 26, 1973

[54] METHOD AND SYSTEM FOR RECORDING, PROCESSING AND DISPLAYING VISUALLY OBSERVED INFORMATION FROM PHYSICAL STRUCTURE

[75] Inventor: Richard L. Mani, San Francisco, Calif.

[73] Assignee: Comprehensive Health Testing Laboratories, Inc., San Francisco, Calif.

[22] Filed: Dec. 9, 1971

[21] Appl. No.: 206,488

[52] U.S. Cl. . 235/61.9 R, 235/61.12 R, 235/61.6 B
[51] Int. Cl. ........................................... G06k 19/00
[58] Field of Search .................. 235/61.6 A, 61.6 B, 235/61.9 R, 61.6 R, 61.12 R, 61.6 E, 151 PL, 151.11, 151, 151.2, 197, 184; 340/146.3 AC, 172.5, 146.3 Z; 35/7, 40, 48, 54; 128/2.1 R, 2.1 A

[56] References Cited
UNITED STATES PATENTS

| | | | |
|---|---|---|---|
| 3,684,872 | 8/1972 | Clauset et al. .................. | 235/61.6 B |
| 3,391,392 | 7/1968 | Doyle .............................. | 340/172.5 |
| 3,534,396 | 10/1970 | Hart et al. ...................... | 235/61.6 E |
| 3,619,573 | 11/1971 | Philip et al. .................... | 235/61.12 R |

*Primary Examiner*—Thomas A. Robinson
*Attorney*—Paul D. Flehr et al.

[57] ABSTRACT

A method and system for recording visually observed information of a physical structure and producing graphic displays of the information in accordance with a predetermined program. The system includes a record sheet provided with a graphic illustration of a typical anatomical structure together with indicia receiving sites on the sheet with certain of the sites being superimposed on selected portions of the anatomical structure and arranged in a pattern which, when read by mark sense reading means, provides an input into data processing equipment programed to generate a printout of diagnostic descriptions of the anatomical structure. The program is arranged to generate diagnostic descriptions which progress from generalized statements to more specific descriptions and nuances of the diagnosis in accordance with the order in which the sites are marked. In one embodiment certain of the sites are arranged in a first group adjacent to or superimposed over a portion of the anatomical illustration for which information is to be described, with additional sites being provided on the sheet adjacent the illustration for recording specific description and nuances of pathology for one or more sites marked in the first group. Additional sites are provided on the sheet for recording generalized information regarding the observed pathology and patient access information and the like. Certain of the sites are provided adjacent printed pattern recognition symbols generally descriptive of the information to be recorded by marking such site.

14 Claims, 3 Drawing Figures

METHOD AND SYSTEM FOR RECORDING, PROCESSING AND DISPLAYING VISUALLY OBSERVED INFORMATION FROM PHYSICAL STRUCTURE

BACKGROUND OF THE INVENTION

This invention relates to the recording, processing and graphic display of visually observed information, and in particular relates to the method and system for recording on a record sheet information visually observed from a given physical structure and the processing of the information in accordance with a predetermined program to provide a graphic description or diagnosis of the observed information.

It is conventional to provide mark sense and punched card forms for the recording and machine processing of various types of data and information. These conventional forms are characterized in locating the various mark or punch positions on the form or card so that each such position is correlated according to the order of machine reading to denote an item of information or quantity which is specified by a predetermined rule or text for proper interpretation, encoding and decoding of the information.

Data recording forms of the type described present a number of disadvantages and limitations when used in areas such as the recording of information of a complicated or technical nature concerning a given physical structure presenting a large number of selections and combinations of the information items. For example, mark sense and punched card forms of the type described do not lend themselves to applications for describing anatomical structure and pathology. It is present practice for a radiologist in making a diagnosis from an X-ray film to orally dictate his description of the anatomical structure and pathology for subsequent transcription. This procedure is time consuming and introduces various error factors such that the data cannot be easily checked and corrected. One such error source of importance is the requirement for the intermediation of a skilled secretary having a high level of competence in radiological and medical terminology for transcribing the dictation. The use of existing mark sense and punched card forms for the recording and processing of such anatomical descriptions is infeasible because many hundreds of printed statements would be required to identify the individual mark sense positions for enabling the user to specify the anatomical structure of the human body to be described and then describe with reasonable degree of specificity the nature and the auances of the observed physiologic or pathologic condition for such structure. Moreover, the system would be time consuming and difficult to use because of the great number of mark positions required for a complete diagnosis. Accordingly, the need has been recognized for a new and improved method and system for recording and processing visually observed information which obviates the existing disadvantages and limitations inherent in conventional reporting systems of the type described.

OBJECTS AND SUMMARY OF THE INVENTION

It is a general object of the invention to provide a new and improved method and system for the recording on a record sheet or form items of information as visually observed from a given physical structure or representation thereof, the processing of the information in a predetermined manner for proper interpretation thereof, and the display of the interpretation in graphic form.

Another object is to provide a method and system for recording information as visually observed from a structure or representation thereof, such as a radiograph of part of the human anatomy, in which a record sheet is provided with a typical graphic illustration of the anatomical structure together with a plurality of indicia receiving sites such as mark or punch position sites which are arranged in a manner providing for the recordation of information which ranges from the general to the specific for describing selected portions of the structure, which provides a relatively permanent record of the information, facilitates error checking, and provides a computer generated read-out of predetermined description or diagnostic statements of the recorded information.

Another object is to provide a method and system of the type described in which observed anatomical-physiologic or anatomical-pathologic variations and nuances can be described by marking combinations of indicia receiving sites. This invention thereby provides a fixed field system which approaches the flexibility in descriptive textual output of existing variable field systems (free dictation or text).

Another object is to provide a method and system of the character described which incorporates a record sheet provided with a typical graphic illustration of an anatomical structure, indicia receiving sites at least certain ones of which are superimposed upon portions of the illustration to be described, and with additional sites being provided on the sheet adjacent individual pattern recognition symbols corresponding to a particular condition or nuance which is to be described by the marking of the additional sites.

Another object is to provide a method of the character described which includes the scanning and machine reading of a record sheet provided with indicia receiving sites superimposed over an illustration of a physical structure to generate a series of coded signals, processing the coded signals according to a predetermined program for interpreting information represented by sites marked with indicia, and providing a graphic display of the interpretation.

The foregoing and additional objects of the invention are provided in the invention through a record sheet imprinted with an illustration of a physical structure, such as a part of the human anatomy, for recording information as visually observed from the structure or a representation thereof. The sheet is further provided with indicia receiving sites, such as printed symbols indicating mark or punch positions arranged in a matrix suitable for mark sense machine reading. Certain ones of the sites are arranged adjacent or superimposed over portions of the illustration whereby a marking of such sites provides a recordation describing or indicating information as visually observed from the corresponding portion of the structure. Certain others of the sites are provided on the sheet adjacent to individual pattern recognition symbols or text by which further information may be recorded, such as for more specifically recording the description or nuances of the anatomy or pathology as observed.

In the method a record sheet of the type described is utilized by marking selected indicia receiving sites which are superimposed over a portion of the illustration corresponding to an observed portion of the anatomical structure for which a generalized statement is to be generated. As required, others of the sites on the sheet are marked to record information of a more specific nature describing further observed anatomical or pathological conditions and nuances. The indicia receiving sites are scanned by mark sense reading means in a pre-determined order to generate a series of coded signals as an input into data processing equipment which is programed to analyze the inputs and generate a graphic display of the interpretation or diagnosis of the recorded information.

Additional objects and features of the invention will appear from the following description in which the preferred embodiments of the invention have been set forth in detail in conjunction with the drawing.

DESCRIPTION OF THE PREFERRED EMBODIMENTS

The present invention provides a simple and convenient method and system for recording, processing and graphically displaying interpretations or diagnoses of information visually observed from various physical structures. The invention finds particular application in systems where it is desirable to accurately record and use visually observed information comprised of a large number of descriptive or quantitative items out of which there are many combinations describing with varying degrees of specificity the observed structure. The invention will be specifically described in relation to a radiographic report system in the medical field. However, as will become apparent the invention will find application in other fields of use in the recording, processing, and interpretation of information as visually observed from physical structures capable of being graphically illustrated on record sheets of the type described herein.

Figure 1:
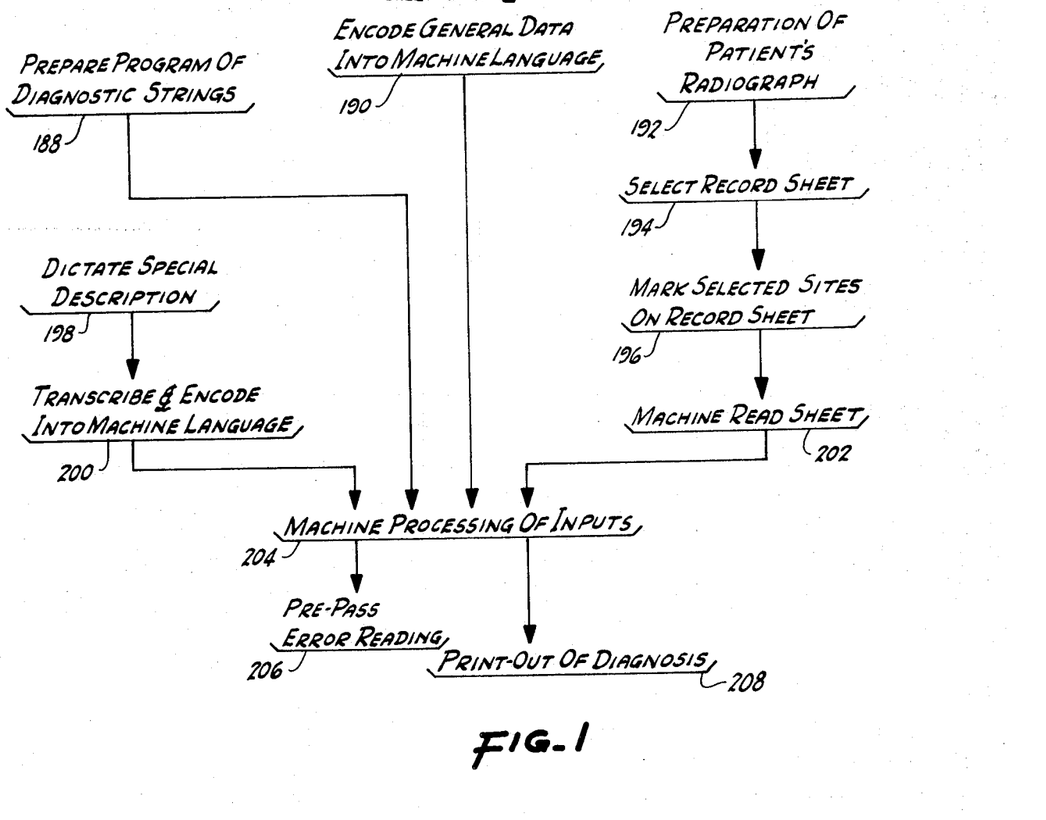
FIG. 1 is a flow diagram illustrating the method of the invention.
Figure 2:
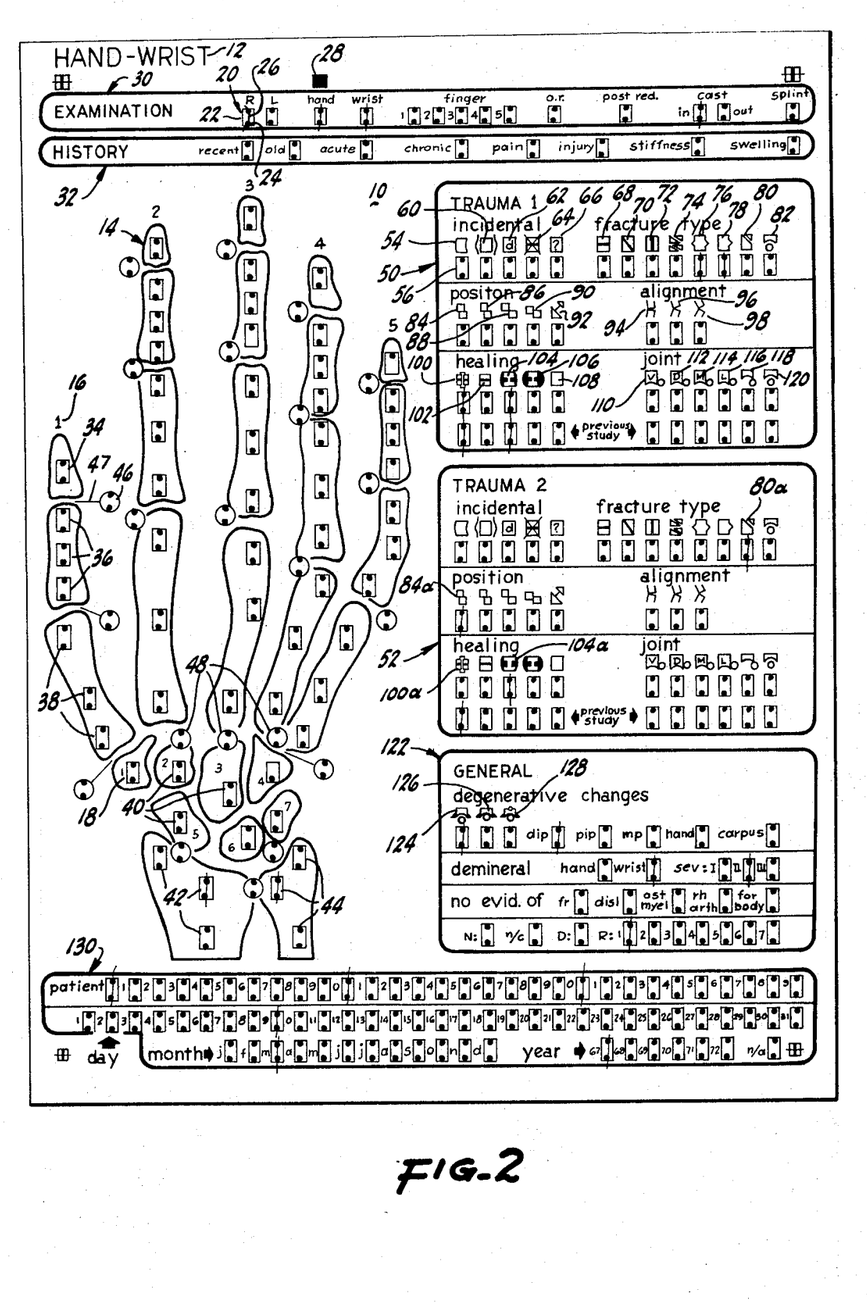
FIG. 2 is an illustration of one embodiment of the invention comprising a record sheet for use in a system practicing the method of FIG. 1.
Figure 3:
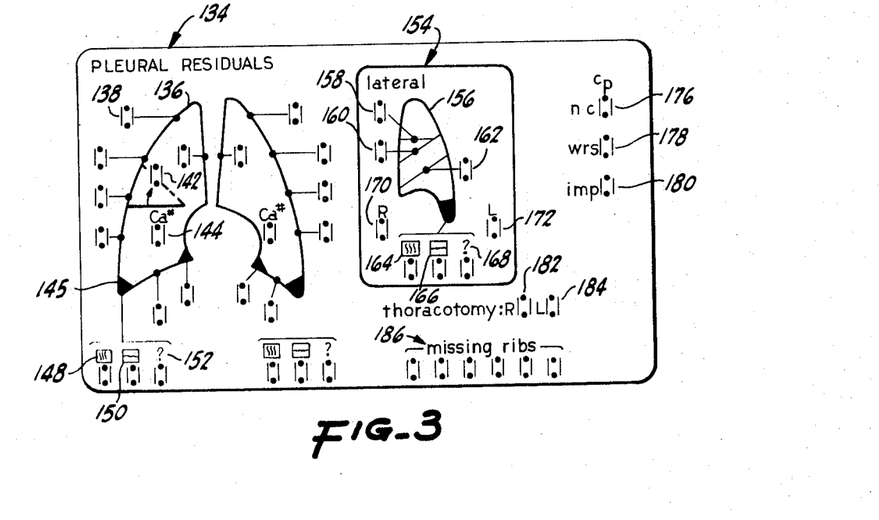
FIG. 3 is an illustration of another embodiment of the invention comprising a portion of a record sheet for use in a system practicing the method of FIG. 1.

The invention provides a method as depicted in the flow sheet of FIG. 1 which would make use of a record surface or sheet prepared in accordance with the embodiments of FIGS. 2 and 3. The record surface or sheet 10 of FIG. 2 is formed of a suitable paper, cardboard, or other material adaptable for imprinting with the illustrations, symbols and text to be described, adaptable for receiving indicia as in the form of a graphic mark or punch-out, and adaptable for scanning and machine reading of the indicia.

The record sheet 10 is specially adapted for use in reporting information as observed by a radiologist from a radiograph, such as an X-ray film, or other depiction of the hand and wrist anatomical bone structure of the human anatomy. A title 12 in text form is printed on the sheet for convenient recognition of the particular "hand-wrist" form species. A graphic illustration 14 of a typical anatomical hand-wrist bone structure is printed on a left hand portion of the sheet to generally correspond to the structure visually observed on the radiograph. Printed numbers as at 16 and 18 are provided for identification of individual fingers and/or wrist bones in a manner to be described.

Record sheet 10 is further provided with a plurality of indicia receiving sites adapted to be marked by the user for subsequent machine reading by suitable mark-sense reading equipment. In the record sheet embodiment illustrated the indicia receiving sites comprise printed symbols as at 20 formed in rectangular shaped blocks 22 enclosing a pair of relatively small, vertically sligned printed dots 24. The printed blocks and dot pairs for each site are precisely located on the sheet in relation to a predetermined order of machine scanning along a grid of mark-sense positions so that each site coincides with a particular mark-sense position in the order of machine reading. The radiologist applies a graphic mark 26 by suitable means such as a machine readable pencil or other instrument between the dot pairs at the selected indicia receiving site. While the preferred embodiment is illustrated as employing a visually observable pencil mark at the selected site, it is understood that the invention contemplates that a selected indicia receiving site may be marked by other means such as by punching through the material of the sheet with a suitable stylus, or by application of a magnetic responsive mark. Thus the term "indicia" and "mark" as used herein are intended to encompass any visual, magnetic, punch or other physical means by which the user or radiologist indicates that a particular site has been selected for recording a specific item of information.

Where the record sheet is of the type illustrated employing the use of visual marks at the selected sites, suitable optical mark reading means of known construction would be employed for scanning and reading the record sheet. Where the record sheet is of the type adapted to receive punched or magnetic responsive marks at the sites then corresponding reading means suitable for sensing punch or magnetic indicia would be utilized. The particular type of mark-sense reading equipment employed further would include means for converting the sensing of indicia sites into coded signals for an input into associated data processing equipment. Such data processing equipment is conventional and preferably would include a digital computer adapted for programing in a manner to be described for processing the data input and generate an output in the form of printed text providing a description or diagnosis of the observed structure.

Where a plurality of different forms or record sheet species are employed in the program, such as hand-wrist sheet 10, a "Routine Chest" record sheet a portion of which is depicted in FIG. 3, and record sheets for other anatomical structure such as cervical-spine, foot, leg-ankle and the like, not shown, then each sheet species would be pre-printed with one or more coded index marks as at 28 superimposed on particular indicia receiving sites. When these index marks are scanned by the reading equipment an input is provided into the computer for an automatic selection of the predetermined program adapted to process information relating to the selected sheet.

The first series of indicia receiving sites for selective marking by the radiologist are grouped within the cartouche 30 printed with the title "examination." Suitable headings comprising words, letters and numerals are printed adjacent the various sites as an indication of the category of information which is to be recorded. Thus, either of the first pair of sites at the left of the cartouche is to be marked for indicating that the anatomical structure is either right or left on the patient. Either or both of the next pair of sites are to be marked for indicating that the diagnosis is for either or both of the hand or wrist, the next set of five numbered sites are to be marked if the diagnosis is for individual ones of the fingers, the site identified "o.r." is to be marked if the radiograph was taken in the operating room, the site identified "post red." is to be marked for indicating post reduction of fracture or dislocation, the next pair of sites are for indicating that the patient's hand-wrist is either in or out of a cast, and the last site is to be marked if a splint is present.

The next group of indicia receiving sites is contained within the cartouche 32 printed with the title "history." The sites within this cartouche are adapted to be marked for indicating generalized statements regarding the character or condition of the patient's trauma and as a summary of the cause for the report. Thus, a first pair of sites may be marked to indicate the duration of the trauma, the next pair may be marked to indicate whether the condition is acute or chronic, and the remaining sites may be marked for indications of pain, injury, stiffness and swelling.

A group of the indicia receiving sites are superimposed directly upon or immediately adjacent to the anatomical illustration 14. The sites indicated by the rectangular blocks, of which site 34 is an example, are superimposed directly over a portion of the anatomical structure for which an item of information is to be recorded by the radiologist. Thus, the site 34 when marked provides location identification of a trauma at the distal phalanx of the finger identified with index No. 1, the group of three sites 36 provide identification for intermediate and end portions of the proximal phalanx for the same finger, the group of three sites 38 provide identification of intermediate and end portions of the associated metacarpal bone, the group of seven numbered sites 40 provide identification for the carpal bones, the group of three sites 42 provide identification for diverse portions of the distal radius bone, and the group of three sites 44 provide identification for diverse portions of the distal ulna bone. Another series of sites are enclosed within a plurality of printed circles as at 46 for identifying and specifically locating a trauma which would occur at the joint to which a lead line 47 is directed. Thus, the site 46 provides identification of a trauma at the interphalangeal joint of the finger indexed as number 1. Similarly, the sites 48 provide identification for the joints between the metacarpal and carpal bones with these latter sites superimposed directly over the corresponding joints of the illustration. The provision of solid rectangles printed for the locator sites of the bone trauma, and solid circles printed for the locator sites of the joint trauma affords a degree of pattern recognition by which the radiologist can quickly and easily identify and mark the desired site.

The computer program preferably is prearranged so that a single mark on any one of the locator sites which are superimposed over or immediately adjacent to selected portions of the anatomical illustration 14 will generate a predetermined generalized statement ("string") regarding the identified anatomical part after the report sheet is machine read and the data is processed. For example, a string can be programed into the computer which would generate a textual read-out stating that an undisplaced fracture has been observed for a particular portion of the bone anatomy which corresponds to that portion of the illustrated bone anatomy upon which a single site has been marked by the radiologist.

The invention provides means for indicating more specific information or nuances in the nature and character of the trauma which has been identified for the sites marked on or adjacent to anatomical illustration 14. For this purpose a pair of cartouches 50, 52 are printed on the record sheet adjacent illustration 14. These cartouches are identified respectively as "trauma 1" and "trauma 2," and each contain identical groups of indicia receiving sites arranged in a predetermined pattern for providing inputs to the data processing equipment when scanned by the reading equipment. The computer program is arranged so that marks placed in one or more sites of the first cartouche 50 record information relating to the nature and character of the trauma corresponding to whichever locator site is first marked, according to a pre-arranged order of marking by the radiologist. Preferably the marking order is from top to bottom in rows which progress from left to right across the sheet. Similarly, the computer program is further arranged so that if a second locator site has been marked identifying the location of a second trauma then additional marks placed on the selected sites within cartouche 52 record more specific information regarding the nature and character of the second trauma.

The sites within each of the cartouches 50, 52 are arranged in six distinct groups each printed with an appropriate identifying heading and with each site being identified both by a pair of spaced dots within a solid rectangle and by individual pattern recognition symbols to facilitate identification and marking of the appropriate sites by the radiologist. It will be seen that each of the pattern recognition symbols which will be described bears a degree of physical association with the nature or character of the anatomical or pathological feature which is to be described. The site groups within "trauma 1" cartouche 50 are typical and include a first group with the heading "incidental" comprising six sites by which the radiologist can record information of a generalized nature concerning a trauma to bone structure. The pattern recognition symbols, of which symbol 54 adjacent the first site 56 is an example, are specially characterized in that an enclosed block symbol generally represents bone structure, with variations of the block symbol indicating a specific physiologic or pathologic feature of such structure.

The first pattern recognition symbol 54 is specially characterized with curved sides, and the radiologist is instructed to recognize this symbol as representing the trauma as being an old fracture so that the adjacent site 56 would be marked if such information were to be recorded for the first trauma. The next site 58 is positioned adjacent a specialized symbol 60 which represents that soft tissue swelling is associated with the trauma. Symbol 62 represents the feature of demineralization of the bone structure. The next symbol 64 contains both a line across the block, which would otherwise indicate a fracture, and a superimposed "X" indicating the absence of any such feature. The last symbol 66 includes a question mark which represents a questionable fracture for which there is insufficient radiographic evidence for a specific diagnosis.

The next adjacent group of eight sites in the top row is provided with a heading "fracture type" with associated pattern recognition symbols by which it is possible to indicate by one or more marks the type of fracture with greater particularity. Thus, the first symbol 68 represents a transverse fracture, the symbol 70 represents a spiral fracture, symbol 72 represents a diagonal fracture, symbol 74 represents a comminuted fracture, symbol 76 represents an impacted fracture, symbol 78 represents a greenstick fracture, symbol 80 represents an avulsion fracture, and symbol 82 illustrating a ball and socket joint represents a fracture in a joint.

The next group of five sites in the middle row is associated with a heading "position" for specifying fracture position. The first series of three pattern recognition symbols 84, 86, 88 represent nuances of bony malposition, i.e., displacement varying between mild, moderate and severe, respectively. The symbol 90 represents an overriding displacement and the symbol 92 represents separation of the fracture fragments.

The next group of three sites is associated with the heading "alignment" and includes the pattern recognition symbols 94, 96, 98 representing nuances of malalignment of bone, i.e., angulation, mild, moderate and severe, respectively.

The next group of ten sites arranged in two rows of five sites each is associated with the heading "healing." The upper row immediately adjacent the pattern recognition symbols is to be marked for recording information as presently observed from the radiograph, while the lower row is to be marked for indicating the healing condition, as represented by the associated symbol which is selected for marking, from the previous study of the trauma. The first symbol 100 associated with the first pair of vertically spaced sites includes both a solid line through the block representing a fracture and a vertical representation of a pin thereby indicating that the fracture is internally fixed. The next symbol 101 represents a plain fracture which is unhealed. The symbol 104 represents early signs of healing, the symbol 106 represents significant healing and the symbol 108 represents that the trauma is healed.

The next group of twelve sites comprising two rows of six sites associated with the heading "joint" includes pattern recognition symbols with ball and socket elements arranged to indicate the presence or absence of any dislocation and the character and nuances thereof. The upper row of sites is to be marked for indicating information of this type as presently observed while the lower row is to be marked for indicating information from a previous study. The first symbol 110 illustrates a dislocation in that the ball is shown as completely out of the socket, with the socket containing the letter V indicating that the dislocation is volar in direction i.e. toward the palm. The next adjacent symbol 112 indicates dorsal, the symbol 114 indicates medial and the symbol 116 indicates a lateral dislocation. The symbol 118 represents a partial fracture with the ball shown as only partially out of the socket, and symbol 120 indicates a normal joint.

An additional cartouche 122 is provided with groups of indicia receiving sites for indicating the presence or absence of pathological information of a generalized character. A heading "general" is printed within the cartouche and the upper row of sites are associated with a sub-heading "degenerative changes" with pattern recognition symbols, words and abbreviations associated with individual sites. The first series of three sites associated with the three symbols 124, 126, 128 represent the three commonly accepted degrees of degeneration changes of bone and provide for the indication of nuances ranging from mild (bony spurs) to moderate (bony spurs, narrowed joint) to severe (bony spurs, narrowed joint, cystic changes) repectively. The adjacent group of five sites are to be marked in combination with a mark in one of the first three sites for recording the location of the degenerative change. Thus, the abbreviation "dip" indicates distal interphalangeal location, the next abbreviation "pip" represents proximal interphalangeal, the abbreviation "mp" represents metacarpal, and the last two sites indicate hand and carpus locations, respectively.

The next lower row of sites within cartouche 122 is to be marked for indicating the location and nuances of any noted demineralization. Either of the first two sites is marked for indicating hand or wrist location combined with a marking of one of the three adjacent sites for indicating nuances of severity between mild, moderate and severe.

The next lower row of five sites is to be marked where there is no observation of various conditions identified by the associated abbreviations, as follows: fracture, dislocation, osteo myelitis, rheumatoid arthrits, or foreign body, respectively. arthritis, The bottom row of sites is to be marked for indicating various unclassified items of information. Thus, the first site associated with the letter N is to be marked where the observed anatomy is normal, and the second site identified "n/c" is to be marked where there is no observed change from a previous study. The third site associated with the letter D is to be marked where the radiologist desires to dicate additional information not provided for on the record sheet, such as information regarding a third noted trauma. The computer is programed so that when it receives an input indicating that this site is marked it will store the recorded information in its memory for subsequent processing and read-out. The dictated material is transcribed and encoded into machine language with a coded accession number corresponding to that of the record sheet. When the additional dictated material is received as an input into the computer the entire data for the particular radiograph will be processed for a print-out of the complete diagnosis. The next series of seven sites in the bottom row labelled 1 through 7 adjacent the heading R may be marked for indicating a code number for the individual radiologist preparing the report.

A cartouche 130 is provided at the lowermost portion of the record sheet for recording information regarding identification of the patient and identification of the patient's previous radiograph study, if any. The first row of sites following the heading "patient" are associated with three sets of numbers which may be marked in combination to supply the patient accession number. This patient accession number is utilized by the computer to link patient identification data previously encoded with diagnostic data from the record sheet. Below this a group of sites are provided for identifying the date of the previous radiograph study. The uppermost row of this group indicates the day of the month, the first group of the bottom row indicates the month, and adjacent group of the bottom row indicates the year, and the last site of this row identified "n/a" is to be marked if a previous study is not available.

FIG. 3 illustrates another embodiment of the invention comprising a cartouche 134 forming a portion of a complete record sheet for use by a radiologist in performing a "routine" chest examination of a patient's chest radiograph. Such a record sheet would be similar to the hand-wrist sheet 10 described above and would include appropriate indicia receiving sites arranged in suitable groups of the nature described therein, i.e., sites providing coded information for computer identification of the routine chest program to be used with the report sheet, and groups of sites for recording generalized information of the examination, history, patient's accession number and the previous study, if any. The cartouche 134 is specially adapted for recording information regarding pleural residuals of the patient's lungs, and a printed heading of this nature is provided within the cartouche. Other groups of indicia receiving sites, not shown, would be provided for recording other information observed from a given chest radiograph such as parenchymal residuals, pulmonary emphysema, and pathology involving organs such as the diaphragm, heart, aorta, spine, ribs, and the like.

A graphic illustration 136 comprising the general outline of typical lung organs is printed within the cartouche 134. Superimposed on or immediately adjacent to the illustration are a plurality of indicia receiving sites arranged in a prederermined pattern for indicating, when marked, the identification of anatomical location and pathology of the lung structure. Thickening of pleura tissue is identified by the marking of various indicia receiving sites comprising pairs of printed, vertically spaced dots enclosed between pairs of vertical lines with lead lines locating the described tissue on the illustration. As an example site 138 is to be marked for identifying thickening of the apical pleura of the right lung. A site 142 is superimposed over the right lung illustration together with diverging solid and dashed lines for indicating thickening and elevation of the minor fissure. These lines provide a pattern recognition function in that the solid line represents a normal fissure with the arrow and dashed line indicating a typical position for an elevated fissure observed from the radiograph. Additionally, a site 144 is provided adjacent the printed symbol "Ca$^{++}$" for indicating thickening with calcification. At the base portion of each lung illustration a solid triangular pattern recognition symbol, as at 145, is printed for indicating blunting of the costophrenic angle identified by marking one or more of the indicia receiving sites connected with the selected symbol by a lead line. These solid triangular symbols are characterized in forming typical representation of the pathologic pattern as directly observed from the radiograph. Three individual pattern recognition symbols are printed adjacent each of three sites grouped together for recording specific pathology associated with the observed condition. The first symbol 148 indicates blunting caused by fibrotic scarring, the second symbol 150 indicates blunting due to fluid, and the third symbol 152 indicates questionable blunting. As required these three sites may be marked in combination to record the full range of information.

A smaller cartouche 154 labeled "lateral" is provided for recording information observed from a radiograph taken laterally of the chest. An illustration 156 of the outline of a typical lung organ taken in lateral view is printed within this cartouche. Two sites 158, 160 are provided adjacent the illustration with lead lines directed to diagonal lines which represent a typical fissure as observed from the radiograph, for recording thickening of the minor and major fissures, respectively, of the right lung. A site 156 is provided with a lead line directed to another diagonal line for recording thickening of major fissure of the left lung. A solid triangular shaped symbol at the base of the illustration represents blunting recorded by marking one or more of the three grouped sites adjacent the symbol 164 indicating blunting with fibrotic scarring, symbol 166 indicating blunting with fluid, and symbol 168 indicating questionable blunting. The sites 170 and 172 are to be marked for indicating whether the observed blunting is in the right or left lung, respectively.

An additional group of three sites 176, 178, 180 aligned under the symbol "Cp" are provided for recording a comparison with a previous study. Thus, the site 176 is to be marked for indicating no change, the site 178 is to be marked for indicating evidence of definite interval progression, and site 180 is to be marked for indicating evidence of interval improvement. A group of two sites 182, 184 is provided for indicating evidence of a previous thoracotomy in either the right or left lung, respectively. A group of six sites 186 is provided for indicating the number of ribs which are missing from the patient's rib cage.

The method of practicing the invention is illustrated graphically in FIG. 1. A predetermined program of computer strings providing the textual diagnostic statements and data correlated to specific indicia receiving sites on the record sheet is prepared at step 188. Where a plurality of record sheet species is employed for various anatomical structures, a different program is prepared for each such structure.

General data regarding the patient such as his name and address together with the patient's assigned accession number are encoded into machine language at step 190, preferably by means of a suitable computer terminal at the receptionist area of the medical facility.

In step 192 a radiograph is prepared for observation of the anatomical structure which is to be diagnosed. In step 194 the appropriate record sheet of the character described herein is selected corresponding to such anatomical structure, for example the patient's hand-wrist as exemplified by the record sheet 10 of FIG. 2. At this point the radiologist or his assistant may mark as with a pencil selected indicia receiving sites within the examination cartouche 30, history cartouche 32 and cartouche 130 identifying the patient's accession number and previous study, if any. At step 196 the radiologist proceeds to observe and analyze the radiograph. If a trauma is noted then the locator site positioned on or adjacent to the portion of illustration 14 corresponding to the location of the trauma is marked. Where the radiologist desires to record more specific information regarding the noted trauma then he proceeds to mark selected sites within cartouche 50, for example to indicate the type, position, alignment or extent of healing of the fracture, or the like. Where the radiologist notes an additonal trauma then the corresponding locator site is marked on illustration 14 in accordance with a predetermined marking order on the illustration. More specific information regarding the second trauma is recorded by marking selected sites within the second cartouche 52. Further information of a generalized character such as degenerative changes, demineralization, the absence of fractures, dislocations, and the coded identification of the radiologist may be marked within cartouche 122.

Where the radiologist desires to dictate a special description, or the diagnosis of a third trauma, then the site adjacent the letter D within cartouche 122 is marked for instructing the computer to store and hold the foregoing information. The special description or diagnosis is dictated at step 198 and transcribed and encoded into machine language at step 200.

The completed record sheet is scanned by the mark sense reading equipment such as an optical mark reader at step 202 to generate a series of coded signals providing an iput into the data processing equipment. The various inputs are received and processed at step 204. An initial pre-pass error reading step at 206 is programed to provide a preliminary reading of the entire record sheet to determine if sufficient information has been recorded for a meaningful diagnosis. Thus, should the pre-pass reading step indicate that no marks have been placed on or adjacent to the anatomical illustration for locating a trauma then the data processing procedure would be arrested with an indication made to the operator that an error exists on the record sheet. If the pre-pass error step is negative, i.e., the absence of errors, then the computer proceeds with the program in interpreting the recorded information to generate at step 208 the series of predetermined graphic displays of the diagnostic descriptions, which preferably take the form of a print-out of textual matter.

An example of the use and operation of the method and system of the invention is as follows. Assume that a radiologist desires to examine a patient's hand-wrist radiograph. An individual accession number is assigned to the patient and encoded into machine language together with the patient's name and address for input and storage into the computer. The radiologist selects the hand-wrist record sheet 10 and marks the desired sites in th examination cartouche 30 and history cartouche 32 providing generalized information. As illustrated in FIG. 2 the site 20 has been marked together with the hand, wrist and "in" cast sites. The radiologist next has marked the middle site 42 at the terminal portion of the radius bone for purposes of locating the first trauma, and had also marked the middle site 44 at the terminal portion of the ulna bone for locating the second noted trauma. For purposes of recording more specific information regarding the trauma 1, the radiologist proceeds to cartouche 50 where the sites adjacent symbols 74 and 76 are marked within the "fracture type" group for indicating that the fracture is both comminuted and impacted. The radiologist also notes the presence of a metallic fixation or pin by marking the site adjacent symbol 100 in the "healing" group, and he observes and records early signs of healing by marking the site adjacent symbol 104. He also observes and records that the previous radiographic study had shown the metallic fixation and early signs of healing by marking the appropriate sites in the lower row, as indicated.

More specific information regarding the second trauma is recoreded within cartouche 52 where the radiologist has marked the site adjacent symbol 80a indicating an avulsion fracture type, the site adjacent symbol 84a indicating that the nuance of bone displacement is mild, the site adjacent symbol 104 indicating early healing signs, and the site in the lower row adjacent symbol 100a indicating that the previous study had shown a metallic fixation at the trauma 2 location. With the present study showing no such fixation the corresponding site in the upper row is left unmarked.

The radiologist proceeds to cartouche 122 for recording general observations. The site adjacent symbol 124 is marked for indicating the nuance of minor degenerative changes, and the distal interphalangeal location of these changes is recorded by marking the site adjacent the abbreviation "dip." The location of demineralization is recorded by marking the site labelled "wrist" with the nuance of moderate severity recorded by marking the site labelled "II." The radiologist next records his individual code number by marking site number 1 adjacent the letter R.

Within cartouche 130 the radiologist identifies the patient's accession number by marking the three indicated sites adjacent the "patient" heading. Identification of the day, month, and year of the previous study is recorded by marking the indicated sites in the bottom two rows.

The completed record sheet is scanned and read by the optical mark sense reading equipment providing inputs which are processed by the computer to generate the following textual diagnosis:

RIGHT HAND AND WRIST: 01/27/56, in cast.
Compared to the film of: 04/09/67
The undisplaced comminuted and impacted fracture of the terminal radius is still demonstrated with extension into the adjacent joint which is intact. Internal metallic fixation is present and transfixes the fracture in satisfactory position and alignment, unchanged. The fracture is noted in satisfactory position and alignment with early callus formation and healing. Compared with previous study there has been no change.
The avulsion fracture of the terminal styloid is still demonstrated. The fracture shows mild displacement of the fracture fragments at the fracture site. Internal metallic fixation has been removed. The fracture is noted with early callus formation and healing.
Minor degenerative changes (osteophytes) are noted throughout the distal interphalangeal joints.
Moderate general demineralization is demonstrated in the wrist.
IMPRESSION: FRACTURE, TERMINAL RADIUS, EARLY HEALING, UNCHANGED, WITH INTERNAL METALLIC FIXATION. FRACTURE, TERMINAL STYLOID, EARLY HEALING, WITH INTERNAL METALLIC FIXATION REMOVED. MINOR DEGENERATIVE CHANGES. MODERATE DEMINERALIZATION.

The foregoing computer print-out is intended to demonstrate a specific embodiment of the invention in which textual statements have been selected as generally demonstrating a diagnosis of certain pathology for the given anatomical hand-wrist structure. In addition, the ending of the print-out for the example provides a summary impression of the diagnosis. The application of applicant's invention in the recording of information as visually observed from various other physical structures will become apparent to those skilled in the art. It will be understood that numerous variations and modifications may be made in the invention and it is intended to cover in the appended claims all such varia-

I claim:

1. A method for recording and graphically displaying information as visually observed from a given physical structure or representation thereof with a record surface provided with a typical illustration of said structure and a plurality of indicia receiving sites, at least certain of said sites being arranged in a first group which is superimposed over or immediately adjacent to portions of said illustration, including the steps of applying indicia to selected ones of the indicia receiving sites for which an item of information has been observed on the corresponding portion of said physical structure or representation, scanning said sites with indicia sensing means in a predetermined order on said surface, generating a series of coded signals responsive to the sensing of indicia on the sites, and generating a series of predetermined graphic displays of said information responsive to said coded signals.

2. A method as in claim 1 in which said indicia receiving sites are grouped in a plurality of discrete areas on said surface, at least one of said areas including said first mentioned group of sites for recording the location on said structure or representation for said observed item of information, at least another of said areas including a second group of said sites adapted for recording additional items of information describing the portion of said structure or representation at said location, in which the step of applying said indicia includes applying indicia to a selected site within said first group, and applying indicia to one or more additional selected sites within said second group, each of said additional selected sites corresponding to a given physical condition or nuance which is observed from said structure or representation.

3. A method as in claim 1 in which said physical structure comprises an anatomical structure, and given ones of said sites are arranged in a predetermined order on said surface with individual sites corresponding to predetermined statements describing a given anatomical or pathological condition or feature relating to said structure or representation, and the step of generating said coded signals includes generating one or more coded signals each of which represents a statement describing a condition or feature responsive to the sensing of indicia on a site of the illustration corresponding to the portion of the structure or representation which said statement describes.

4. A method for producing a mark-sense sheet from a substrate layer for recording items of information as visually observed from a given physical structure or representation thereof, including the steps of forming at least one graphic illustration of a typical one of said physical structures on said layer, forming a plurality of indicia receiving sites on said layer, certain of said sites being arranged in at least a first group superimposed over a portion of said illustration whereby the presence of indicia on individual sites thereon identifies the location of an item of information which is observed on a corresponding portion of said physical structure or representation, and with certain other of sites being arranged in at least a second group on said sheet whereby the presence of indicia on individual sites thereon identifies an item of information descriptive of the corresponding portion of said structure or representation identified by indicia on a selected site within said first group.

5. A method as in claim 4 in which said physical structure comprises an anatomical structure, and said first mentioned step includes forming an illustration of a typical one of said anatomical structures.

6. A method as in claim 4 in which said second mentioned step includes forming certain others of said sites within said first group substantially adjacent to a portion of said illustration which correspond to a portion of said physical structure or representation to be identified by said indicia.

7. In a system for use in recording and displaying a plurality of items of information visually observed from a given physical structure or representation thereof, the combination of means forming a record surface, means forming a graphic illustration on said surface of a typical one of said structures, and means forming a plurality of indicia receiving sites on said surface, certain of said sites being arranged in a first group juxtaposed with or superimposed on said illustration, said means forming the sites substantially permanently recording an information item with the presence of indicia thereon to identify the location of said item of information observed on a corresponding portion of said structure or representation.

8. A system as in claim 7 in which said surface means comprises a sheet printed with a typical graphic illustration of said structure.

9. A system as in claim 7 in which means are provided forming a plurality of pattern recognition symbols on said surface individual ones of said symbols graphically representing an item of information regarding a portion of said structure and being arranged on said surface adjacent to respective sites which are adapted to record said item with the presence of indicia thereon.

10. A system as in claim 9 in which at least certain of said pattern recognition symbols are formed on or adjacent to selected portions of said graphic illustration, and said last mentioned symbols graphically represent a given physical condition or nuance which can be observed on portions of said physical structure or representation corresponding to the selected portions of the illustration.

11. A system as in claim 7 which includes means for scanning said indicia receiving sites in a predetermined order on said surface to sense indicia on said sites, means for generating a series of coded signals responsive to the sensing of said indicia, and means for generating a series of predetermined graphic displays of said items of information responsive to said coded signals.

12. A system for recording diagnostic information as observed from a given anatomical structure or representation thereof to provide a plurality of diagnostic descriptions of the anatomical or pathological condition of said structure, including means forming a record surface, means forming a typical illustration of said structure on said surface, means forming a plurality of indicia receiving sites on said surface, at least certain of said sites being positioned adjacent to or superimposed on a portion of said illustration corresponding to a portion of said structure or representation for which a description is to be made, means for scanning said sites to sense indicia thereon, means to generate a series of coded signals responsive to sensing of said marks, said signals representating given anatomical or pathological descriptions of the structure corresponding to individual sites, and electronic signal processing means coupled with said signal generating means and programmed to generate a series of graphic displays of said anatomical or pathological descriptions.

13. In a system for use in recording and displaying a plurality of items of information visually observed from a given physical structure or representation thereof, the combination of means forming a record surface, means forming a graphic illustration on said surface of a typical one of said structures, and means forming a plurality of indicia receiving sites on said surface, certain of said sites being arranged in a first group adjacent to or superimposed on said illustration whereby the presence of indicia on individual sites thereof identifies the location of an item of information observed on a corresponding portion of said structure or representation, and at least certain others of said indicia receiving sites being arranged in at least a second group on said surface whereby the presence of indicia on selected sites thereof identifies additional items of information describing a selected portion of said physical structure or representation identified by the presence of indicia on a site within said first group.

14. In a system for use in recording and displaying a plurality of items of information visually observed from a given physical structure or representation thereof, the combination of means forming a record surface, means forming a graphic illustration on said surface of a typical one of said structures, said illustration comprising an anatomical structure, means forming a plurality of indicia receiving sites on said surface, certain of said sites being arranged in a first group adjacent to or superimposed on said illustration whereby the presence of indicia on individual sites thereof indentifies the location of an item of information observed on a corresponding portion of said structure or representation, and means forming a plurality of pattern recognition symbols on said surface, individual ones of said symbols graphically representing an item of information regarding a portion of said structure and being arranged on said surface adjacent to respective sites which are adapted to record said item with the presence of indicia thereon, one or more of said pattern recognition symbols being formed on or adjacent to selected portions of said graphic illustration, said last mentioned symbols graphically representing a given physical condition or nuance which can be observed on portions of said physical structure or representation corresponding to the selected portions of the illustration, and at least certain of the symbols formed on said illustration graphically represent a typical observed pathologic condition of the observed portion of an anatomical structure or representation.

* * * * *